United States Patent [19]

Borglum

[11] 4,296,875
[45] Oct. 27, 1981

[54] FOAM DISPENSING APPARATUS FOR MARKING ON A GROUND SURFACE THE WORKING PATTERN OF A SURFACE WORKING VEHICLE

[75] Inventor: Richard P. Borglum, Janesville, Iowa

[73] Assignee: Richway Industries Ltd., Janesville, Iowa

[21] Appl. No.: 98,500

[22] Filed: Nov. 29, 1979

[51] Int. Cl.³ .................... A01C 15/00; B05B 7/30
[52] U.S. Cl. ............................... 222/617; 222/624; 222/632; 222/214; 239/157; 239/172
[58] Field of Search ................. 239/157, 172; 417/444–447, 474, 477; 169/13; 222/174, 611, 613, 623, 624, 626, 627, 617, 214, 632

[56] References Cited

U.S. PATENT DOCUMENTS

| | | | |
|---|---|---|---|
| 2,703,256 | 3/1955 | Mascaro | 222/613 |
| 3,481,545 | 12/1969 | Cooke et al. | 222/611 X |
| 3,534,533 | 10/1970 | Luoma | 239/157 X |
| 3,807,605 | 4/1974 | Meharry et al. | 222/613 |

FOREIGN PATENT DOCUMENTS 1294499 10/1972 United Kingdom .............. 239/157

Primary Examiner—David A. Scherbel
Attorney, Agent, or Firm—Rudolph L. Lowell; G. Brian Pingel

[57] ABSTRACT

The foam dispensing apparatus is mountable on a self-propelled or manually propelled vehicle such as a planting, fertilizing and spraying machine or like surface working vehicles. A peristaltic or squeeze type pump has an inlet section for receiving air and a foam agent solution which are mixed and successively moved through the pump for discharge in a foam form from the pump outlet section. A discharge nozzle connected to the outlet section is arranged to apply the foam material on the ground surface at a position adjacent to one side of the vehicle. The pump is driven at a rate in response to the ground speed of the vehicle over the ground surface and the air and foam agent solution mixture may be proportionally varied to maintain visual observance of the foam on the ground surface for varying time periods.

3 Claims, 4 Drawing Figures

4,296,875

FOAM DISPENSING APPARATUS FOR MARKING ON A GROUND SURFACE THE WORKING PATTERN OF A SURFACE WORKING VEHICLE

BACKGROUND OF THE INVENTION

The use of peristaltic type pumps on spraying and fertilizing machines for lawn care is disclosed in U.S. Pat. Nos. 2,703,256 and 3,534,533. However, these machines are without any provision for visually indicating on the ground surface the working pattern of the machine to show the limits of application of the material being dispensed. In this respect, U.S. Pat. No. 3,339,843 does teach the use of a peristaltic type pump on a liquid fertilizer spraying machine to mark the fertilized areas. For this purpose, a dye solution is supplied by a peristaltic pump to a special fertilizer dispensing nozzle mounted at one end of a spray boom, for application to the ground with the liquid fertilizer. Both the fertilizer and dye are supplied at rates related to one another and to the ground speed of the machine. This manner of mixing the dye with the fertilizer is for the purpose of reducing dye costs. The peristaltic pump thus functions merely to supply the liquid dye solution into the specially constructed dispensing nozzle for application with the fertilizer to the ground.

SUMMARY OF THE INVENTION

The foam dispensing apparatus is economical in cost, simple and inexpensive in construction and efficient in operation to mark a ground surface with a minimum of maintenance over a long term service life. The apparatus can be mounted on vehicles that are power driven, towed or manually propelled and includes a dispensing pump of peristaltic type which also functions as a foam generator. Air and a foam agent solution are supplied to the pump at relatively controlled rates in response to the ground speed of the vehicle. The pump functions primarily as an air pump with the foaming agent solution being admitted into the air stream. The air and foaming agent are then mixed and successively moved through the pump by the pulsating action thereof for discharge in a foam form. The density or moisture content of the foam can be varied in accordance with the time required for maintaining the foam marking in a visually observable condition on the ground surface.

DETAILED DESCRIPTION OF THE INVENTION

Figure 1:
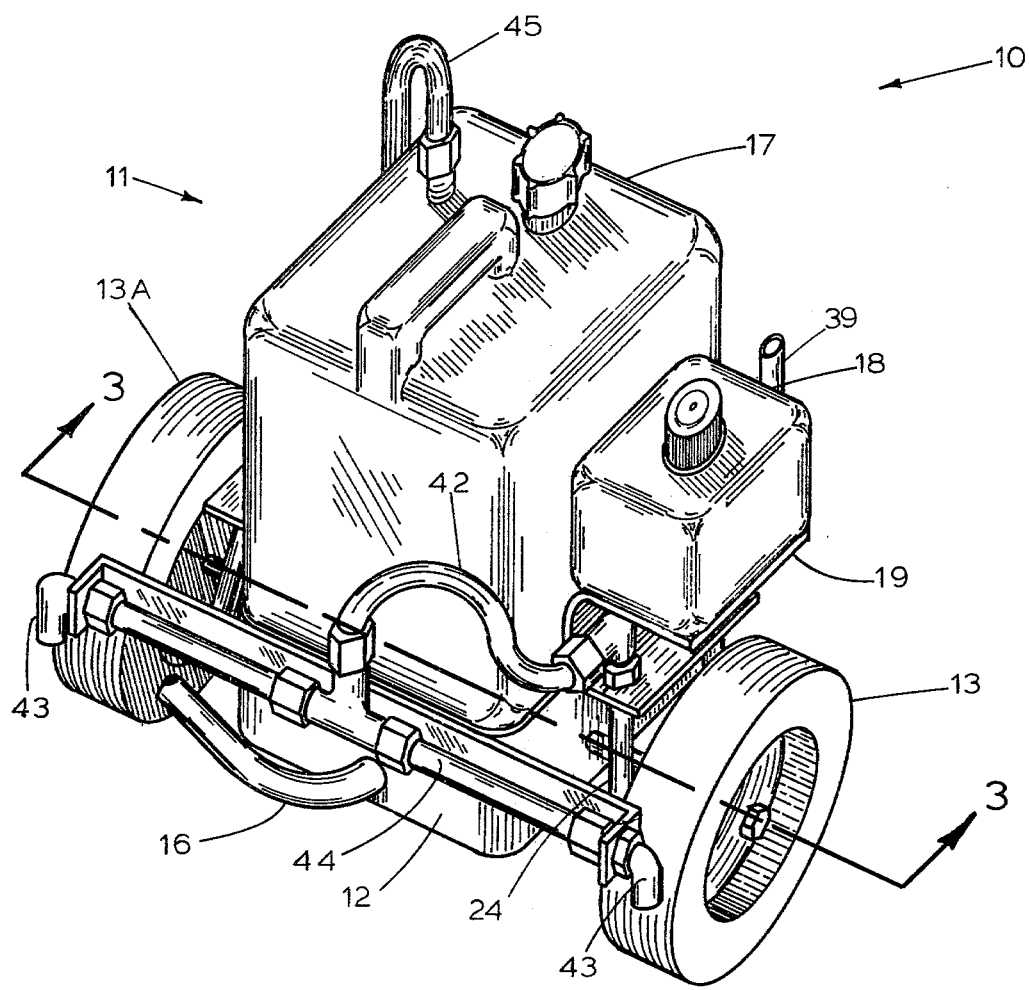
FIG. 1 is a perspective view of a manually propelled lawn spraying machine showing the foam dispensing apparatus of this invention in assembly relation therewith.
Figure 2:
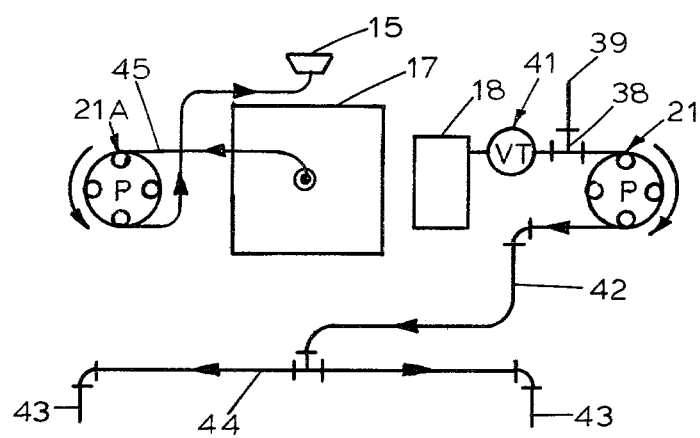
FIG. 2 is a diagrammatic showing of the fluid system for the dispensing apparatus shown in FIG. 1.
Figures 3, 4:
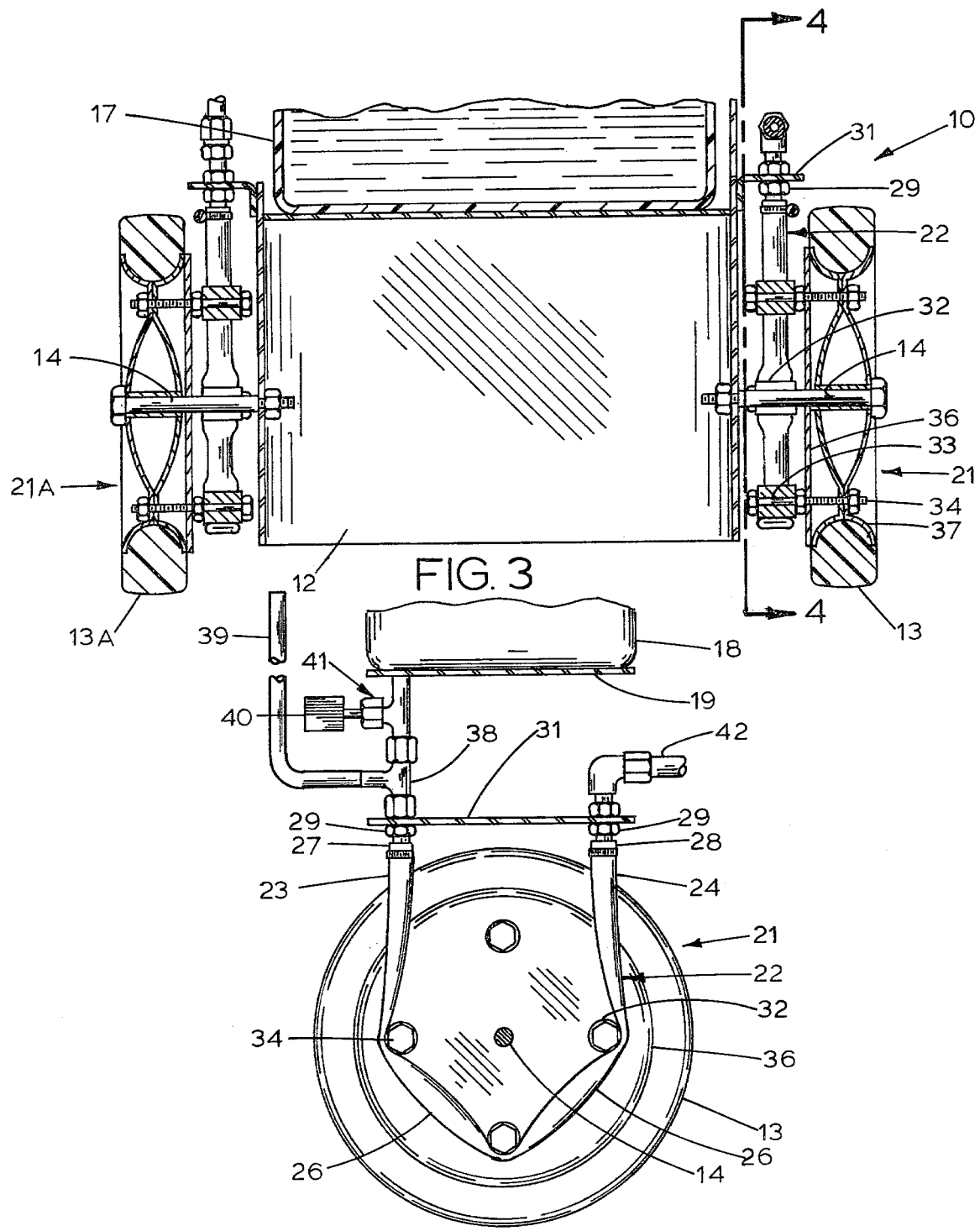
FIG. 3 is an enlarged sectional view taken substantially along line 3—3 in FIG. 1.
FIG. 4 is a sectional view as seen on the line 4—4 in FIG. 3.

With reference to the drawings, the foam dispensing apparatus of this invention, indicated generally at 10 in FIGS. 1 and 3, is shown in assembly relation with a spraying vehicle or machine 11 adapted for manual operation on lawns or the like. The lawn spraying machine 11 includes a base frame 12 that has a pair of ground engaging wheels 13 and 13a rotatably supported on stub shafts 14 extended in axial alignment laterally outwardly from opposite sides of the frame 12. A handle 16 suitably secured to the frame 12 projects rearwardly from the machine 11. A spray nozzle, indicated at 15 in FIG. 2, is mounted on the front end of the frame 12 for dispensing a spraying liquid from a tank 17 carried on the frame 12.

The foam dispensing apparatus (FIGS. 1 and 4) includes a tank 18 for a foaming agent solution. The tank 18 is supported on a bracket 19 suitably secured to the main frame 12 so that the tank (FIG. 1) is located above and inwardly of the ground wheel 13. A pump 21 of a squeeze or peristaltic type, operatively associated with the wheel 13, includes a flexible tube member 22 formed of a plastic or rubber material so that the tube can be pressed or squeezed together along its length to tube closing positions. The tube is formed into a substantially U-shape in side elevation and arranged in a plane substantially parallel to the plane of the ground wheel 13. The tube leg member 23 constitutes an inlet section of the pump 21 and the leg member 24 an outlet section. The intermediate tube section 26 defines what might be termed the pumping portion of the pump 21. The terminal ends 27 and 28 of the inlet section 23 and outlet section 24, respectively, are connected by coupling units 29 to the underside of a mounting plate 31 attached to the frame 12 so as to be positioned below the tank 18 for the foaming agent solution.

The intermediate tube section 26 is trained for successive pressing engagement with certain ones of rollers 32. As illustrated in FIG. 4, the rollers 32 are four in number, angularly displaced 90° apart, and arranged in a circular row about the axes of the shafts 14. Three of the rollers 32, which define a semicircle, are thus in simultaneous pressing engagement with the tube intermediate section 26 at 90° spaced positions thereon. The rollers 32 are rotatably supported on bearing units 33 (FIG. 3) which are carried on bolt assemblies 34 to one side of a disc member 36. The bolt assemblies 34 are adapted to secure the disc member to the rim 37 of the wheel 13. The rollers 32, therefore, on rotation of the wheel 13, are successively moved into and out of pressing engagement with the inlet side and outlet side, respectively, of the intermediate tube section 26 for a purpose to appear later.

The tube inlet section 23 at its terminal end 27 is fluid connected with the tank 18 by a coupling unit 38 which includes an air inlet 39, open to the atmosphere at a position above the level of the foaming agent solution in the tank 18 and a manually adjustable valve unit 41 located between the tank 18 and the air inlet 39. The valve unit 41 is manually regulated by manipulation of a finger control 40 to control the admission of foaming agent solution from the tank 18 into the coupling unit 38 for travel with the air from the air inlet 39 into the tube inlet section 23.

The terminal end 28 of the tube outlet section 24 (FIG. 1) is connected through a fluid line 42 to a pair of foam discharge nozzles or members 43 carried at the opposite ends of a foam distributor member 44 which is supported on the frame 12 so as to extend transversely thereof at a position rearwardly of the ground wheels 13 and 13a. The distributor 44 is of a length to position the discharge members to opposite sides of the machine 11.

In use, and as the machine 10 is advanced along the ground surface, the compressing or squeezing action of the rollers 32 relative to the intermediate tube section 26 effects a pulsating pump action for drawing air from the inlet 39 into the tube end 27 and outwardly from the tube at its terminal end 28. Concurrently with the admission of air into the pump 21, the foaming agent solution from the tank 18 is admitted into the air stream entering the coupling unit 38 for mixing with such air for flow therewith through the tube 22. The rolling and squeezing action of the rollers 32 along the intermediate tube section 26 provides for a complete intermixing of the foaming agent solution with the air such that on reaching the tube outlet section 24, the foaming agent solution is in a foam form for ejection from the discharge nozzles 43. This foam is applied to the ground surface in enlarged drops or globs, rather than in a continuous stream to opposite sides of the machine 11, to positively define the working pattern of the machine and in turn the ground surface acted upon or treated by the machine. Arrangement of a foam dispensing member 43 to each side of the machine 11 provides for a definition of the worked area when the travel of the machine 11 is reversed at each end of the area being worked. The spacing between the foam drops may be decreased by merely increasing the number of rollers 32 in the pump 21 or by varying the ratio of liquid foaming solution to air through adjustment of the valve 41 to vary the liquid flow rate.

By virtue of the ground driven operation of the pump 21, it is seen that the admission of air at the inlet 39 is in direct response to the ground speed or rate of travel of the machine 11 so that the predetermined spacing of the foam markings generally remains the same independently of the ground speed. Some working operations may include a large size working area so as to make necessary maintaining the foam markings visible for periods of time in the neighborhood of fifteen munutes or more, it being understood that after the foam is applied to the ground surface, gradual dissolution thereof takes place until it is no longer visible.

The density or consistency of foam dispensed to the ground id determined by the amount of foaming agent mixed in water to make the foaming agent solution and to a lesser extent by the ratio of air to the solution. Within certain limits, a low ratio of foaming agent solution to air provides a dry and low density foam; while a high ratio of solution to air provides a wet high density foam. However, neither the low density foam or the high density foam lasts as long as a medium consistency foam. The control valve 41 thus determines both the consistency and frequency of foam drops. Within the midrange of ratios, foam consistency reamins fairly constant even though the frequency of foam markings is varied.

As illustrated in the drawings, the foam dispensing apparatus 10 is illustrated in conjunction with a lawn sprayer. In this instance, a second pump 21A may be utilized ith the ground wheel 13A in all respects similar in construction and operation to the pump 21 of the foam dispenser 10. Spraying liquid alone is provided by the pump 21A for distribution forwardly of the machine 11. In this respect and with reference to FIG. 2, the pump 21A draws the spraying liquid from the tank 17 for discharge under pressure from the nozzle 15.

Although the foam dispenser 10 has been described with respect to a gravity feed of the foaming agent solution into the pump 21 and for a driving of the pump 21 from the ground wheel 13, the invention is not to be so limited since it is apparent that the foaming agent solution may be supplied under pressure, and that the pump 21 may be power driven and controlled for operation in response to the ground speed of the machine. Additionally, it is to be understood that the foam dispenser 10 may be utilized on farm and the like equipment and is not limited to lawn care use.

Thus, although the invention has been described with respect to a preferred embodiment thereof, it is to be understood that it not be so limited since changes and modifications can be made therein which are within the full intended scope of this invention as defined by the appended claims.

I claim:

1. A foam dispensing apparatus mountable on a ground surface working vehicle for marking on the ground surface the working pattern of the vehicle on said surface, said apparatus comprising:
    (a) a storage tank on said vehicle for containing a foaming agent solution;
    (b) a combination air pump and foam generating unit including a rotary driven member rotatably mounted on said vehicle;
    (c) a series of circumferentially spaced roller members;
    (d) means mounting said roller members on said rotatable member in a circular row about the axis of rotation of said rotary member;
    (e) a flexible tube member arranged in a plane parallel to the plane of rotation of said rotary member having an inlet section, an outlet section, and an intermediate section;
    (f) means mounting said tube member on the vehicle with said intermediate section trained about and in pressing engagement with certain of said rollers, said pressing engagement acting to close said tube at each of said certain rollers;
    (g) means for fluid coupling said inlet section of the tube, with said tank to receive the foaming agent solution;
    (h) an air inlet for supplying air to said tube inlet section;
    (i) a valve unit in said fluid coupling means located between said tank and said air inlet for controlling the rate of admission of the foaming agent solution into said inlet section for mixing with the air from said air inlet, with portions of the foaming agent solution and air being mixed and successively moved through the tube by the engaged rollers for flow into the outlet section in a foam form and,
    (j) a foam discharge unit connected to the outlet section for directing the foam to the ground surface adjacent one side of said vehicle.

2. The foam dispensing apparatus according to claim 1 including:
    (a) means for mounting said storage tank with the bottom portion thereof above said tube inlet section whereby said foaming agent solution is admitted by gravity action into said tube inlet section.

3. The foam dispensing apparatus according to claim 1 including:
    (a) means for rotating said driven member at a speed in response to the rate of advance of said vehicle over the ground surface.

* * * * *